Patented Oct. 30, 1945

2,388,086

UNITED STATES PATENT OFFICE 2,388,086

GLYOXAL-KETONE CONDENSATION PRODUCTS AND PROCESS OF MAKING THEM

John B. Rust, Verona, N. J., assignor to Montclair Research Corporation, a corporation of New Jersey No Drawing. Application November 20, 1942, Serial No. 466,368

13 Claims. (Cl. 260—64)

The present invention relates to ketone-glyoxal condensation products and the process of making same. It is an object of this invention to provide initially water-soluble resinous materials which in some cases under special conditions are heat convertible to infusible and insoluble masses. Other objects of the invention will hereinafter become apparent.

I have found that glyoxal will react with ketones under either acidic or basic conditions to yield resinous materials which may be hardened further by heat and in some cases produce insoluble and infusible cured masses. It is known that formaldehyde will react with the lower ketones to yield resins. In general pale colored resins may be made by condensing a ketone such as acetone with an excess of formaldehyde under mildly basic conditions. These resins, however, are not substantially advanced in hardness by further heating. It has been found that glyoxal condensation products with ketones such as acetone yield substantially pale colored resins when only, for instance, one mole of glyoxal is used for one mole of the ketone. Furthermore, such resins may be converted into infusible isoluble form merely by prolonged heating.

The resins of the present invention may be further modified by using mixtures of ketones or they may be modified with phenols, amides such as urea, acetamide, p-toluenesulphonamide and the like, or amines such as tetraethylenepentamine, aniline and the like, or melamine. Furthermore, some of the glyoxal may be replaced by other aldehydes such as formaldehyde, acetaldehyde, acrolein, benzaldehyde and the like.

The resins of the present invention may be used as baking lacquers alone or in combination with other resins such as those of the alkyd type, as binders in molding compositions, adhesives, textile sizing materials to impart a permanent stiffness to cloth or in some cases to improve drape and obtain creaseproofness, in leather goods and in paper to increase the wet strength thereof.

The following examples are given to illustrate the process of the present invention and the products obtained. All proportions are in parts by weight.

*Example 1.*—6 parts of acetone were mixed with 24 parts of a 25% aqueous solution of glyoxal. A small amount of sodium hydroxide was added sufficient to bring the pH above 7 and the solution was heated to boiling under a reflux condenser for 45 minutes. A viscous solution resulted which when poured onto a glass plate and dried at 140° C. yielded an infusible film which was unaffected by water.

*Example 2.*—58 parts of acetone were mixed with 165 parts of a 35% aqueous glyoxal solution and at a pH below 4 heated under a reflux condenser at boiling for 3 hours. A viscous solution was obtained containing 36% of glyoxal-acetone resin. This solution was concentrated by evaporation under a vacuum until a clear tough resin was obtained which was readily soluble in water. This resin was redissolved in water and a film poured on a glass plate. The film was baked at 130° C. for 1½ hours. It was insoluble in water and on immersion in water for 24 hours only a slight softening was observed.

*Example 3.*—38 parts of acetonyl acetone were mixed with 115 parts of a 35% aqueous glyoxal solution and heated under a reflux condenser at boiling for about 2 hours. A brown viscous solution was obtained containing 24.5% of glyoxal-acetonylacetone resin.

*Example 4.*—98 parts of cyclohexanone were mixed with 165 parts of a 35% aqueous glyoxal solution and heated to boiling under a reflux condenser for 2½ hours. A brown viscous solution was obtained.

*Example 5.*—6 parts of acetone, 4 parts of melamine and 35 parts of a 25% aqueous solution of glyoxal were mixed and heated to boiling to obtain a clear solution. The solution was then diluted with 90 parts of water and heated under reflux at boiling for 20 minutes. A 10% solution of melamine modified glyoxal-acetone resin was secured. On allowing this solution to stand over for one month no instability was noted. This is in contrast to a melamine-glyoxal resin which sets up to a stiff gel very rapidly.

A solution such as that described above or in Example 1 may be used to impregnate rayon fabric to obtain a creaseproof effect after curing the resin by baking.

*Example 6.*—29 parts of acetone and 82 parts of a 35% aqueous glyoxal solution were heated under a reflux condenser at boiling for 1 hour. A solution of 20 parts of an alkyd resin, containing 71% glyceryl phthalate base resin and 29% unsaturated fatty acids and known to the trade as Rezyl 1102, in 80 parts of n-butanol was added to the acetone-glyoxal mixture. A clear solution resulted which was heated to boiling under a reflux condenser for 1½ hours. The material was then concentrated under a vacuum while beta methoxyethanol was added from time to time. A solution containing about 40% solids was obtained. A film of this solution was baked at 120°–130° C. for 30 minutes to produce a clear tough coating. This was unaffected by water, but whitened slightly on continued immersion for 24 hours. On removal from water the cloudiness in the film disappeared.

*Example 7.*—36 parts of methyl ethyl ketone were mixed with 83 parts of a 35% aqueous solution of glyoxal and heated to boiling under a reflux condenser for 3 hours. A substantially colorless viscous solution of methyl ethyl ketone-glyoxal resin was obtained.

On evaporation of the above solution under a vacuum a substantially colorless, hard, tough resin may be obtained.

Instead of a relatively short reaction time such as was given to the glyoxal resins in the above examples, they may be reacted for very long periods of time such as 20 or more hours. In this manner a higher degree of polymerization is obtained in the resins with a consequent decrease in the final curing times. If desired greater or less amounts of glyoxal may be employed instead of one mole of glyoxal to one mole ketone.

The ketones in the examples used above contain reactive methylene groups which are condensable with glyoxal. Examples of other ketones which may be used in the process of the present invention are diethyl ketone, isobutyl methyl ketone, methyl cyclohexanone, diacetyl, acetyl acetone, and the like.

As illustrated above, the condensation of a ketone with glyoxal may be carried out under substantially acid or alkaline conditions. In some cases it is preferable to make no addition of catalyst but to rely on the natural acidity of the glyoxal solutions commercially available.

In the place of glyoxal I may use glyoxal derivatives such as glyoxal tetraethyl acetal, glyoxal sulfate and the like. When an acid derivative of glyoxal is used a neutralizing agent such as sodium carbonate, sodium acetate and the like should be used in substantial proportions. In the claims it is to be understood that derivatives capable of yielding glyoxal are included in the term glyoxal.

I claim:

1. The process of making a resinous condensation product which comprises heating glyoxal and an aqueous solution of an acyclic ketone having a reactive methylene group, any oxygen present in the ketone being in the form of the carbonyl group only under reflux until a resinous condensation product is formed.

2. A process as set forth in claim 1, in which the glyoxal and ketone are present in substantially equimolecular proportions.

3. The process as set forth in claim 1, carried out in the presence of a condensing agent.

4. The process as set forth in claim 1 carried out in the presence of an acid condensing agent.

5. The process as set forth in claim 1 carried out in the presence of a basic condensing agent.

6. The process of making a resinous condensation product which comprises heating glyoxal and an aqueous solution of acetone under reflux in the presence of a condensing agent until a resinous condensation product is formed.

7. The process of making a resinous condensation product which comprises heating glyoxal and an aqueous solution of ethyl methyl ketone under reflux in the presence of a condensing agent until a resinous condensation product is formed.

8. A resinous condensation product of glyoxal and an acyclic ketone having a reactive methylene group, any oxygen present in the ketone being in the form of the carbonyl group only.

9. A light colored resinous condensation product of glyoxal and an acyclic ketone having a reactive methylene group, any oxygen present in the ketone being in the form of the carbonyl group only, in substantially equimolecular proportions of glyoxal and ketone.

10. A resinous acid-condensation product of glyoxal and an acyclic ketone having a reactive methylene group, any oxygen present in the ketone being in the form of the carbonyl group only.

11. A resinous base-condensation product of glyoxal and an acyclic ketone having a reactive methylene group, any oxygen present in the ketone being in the form of the carbonyl group only.

12. A resinous condensation product of glyoxal and acetone.

13. A resinous condensation product of glyoxal and ethyl methyl ketone.

JOHN B. RUST.